US011336376B1

(12) United States Patent
Xie

(10) Patent No.: US 11,336,376 B1
(45) Date of Patent: May 17, 2022

(54) FLEXIBLE SWITCH SOLUTION BASED ON CO-PACKAGED OPTICS

(71) Applicant: Alibaba Group Holding Limited, George Town (KY)

(72) Inventor: Chongjin Xie, Morganville, NJ (US)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 17/162,552

(22) Filed: Jan. 29, 2021

(51) Int. Cl.
*H04J 14/00* (2006.01)
*H04B 10/572* (2013.01)

(52) U.S. Cl.
CPC .................. *H04B 10/572* (2013.01)

(58) Field of Classification Search
CPC .... H04B 10/572; H04B 10/40; H04B 10/801; H04B 10/503; H04J 14/021; H04J 14/02; H04Q 11/0005; H04Q 2011/0016; H04Q 2011/0052; H04Q 2011/0015; H04Q 2213/13003; H04Q 2213/1301; H04Q 11/0071; G02B 6/4246; G02B 6/4249; G02B 6/43; G02B 6/4284; G02B 6/4285; G02B 6/4292; G02B 6/4293; G02B 6/12004; G02B 6/12019; G02B 6/3598; G02B 2006/12121; G02B 2006/12147; G02B 2006/1215
USPC .......... 398/45, 48, 164, 135–139, 49, 68, 79
See application file for complete search history.

(56) References Cited

U.S. PATENT DOCUMENTS

| | | |
|---|---|---|
| 5,305,412 A | 4/1994 | Paoli |
| 6,016,219 A | 1/2000 | Fatehi |
| 6,175,560 B1 | 1/2001 | Bhagalia et al. |
| 6,266,168 B1 | 7/2001 | Denkin |
| 6,341,032 B1 | 1/2002 | Fukashiro |
| 6,433,922 B1 | 8/2002 | Ghera |
| 6,650,468 B1 | 11/2003 | Bryant |
| 6,754,420 B2 | 6/2004 | Tsuritani |
| 6,952,395 B1 | 10/2005 | Manoharan |
| 7,024,110 B2 | 4/2006 | Jasti |
| 7,123,404 B1 | 10/2006 | Mori |
| 7,136,583 B2 | 11/2006 | Oberg |
| 7,231,146 B2 | 6/2007 | Arecco |
| 7,400,829 B2 | 7/2008 | Watanabe |
| 7,756,422 B2 | 7/2010 | Sakamoto |
| 8,822,895 B2 | 9/2014 | Abedin |
| 9,712,239 B2 | 7/2017 | Murshid |
| 9,787,418 B2 | 10/2017 | Earl |
| 9,917,672 B2 | 3/2018 | Jensen |
| 10,230,464 B2 | 3/2019 | Yuan |
| 10,320,691 B1 | 6/2019 | Matthews |
| 2001/0021045 A1 | 9/2001 | Tervonen |

(Continued)

*Primary Examiner* — Hibret A Woldekidan

(74) *Attorney, Agent, or Firm* — Shun Yao; Yao Legal Services, Inc.

(57) ABSTRACT

One embodiment described herein provides a network switch. The network switch can include a co-packaged optics (CPO) assembly comprising a switch integrated circuit (IC) module and a number of optical modules coupled to the switch IC module, a remote laser source external to the CPO assembly configured to provide continuous wave (CW) light to the optical modules, a number of wavelength multiplexer/demultiplexer arrays external to the CPO assembly, and a plurality of connector arrays comprising a first number of far reach (FR) connector arrays and a second number of datacenter reach (DR) connector arrays.

18 Claims, 8 Drawing Sheets

(56) References Cited

U.S. PATENT DOCUMENTS

| | | |
|---|---|---|
| 2002/0154353 A1 | 10/2002 | Heath |
| 2002/0191904 A1 | 12/2002 | Kani |
| 2004/0037555 A1 | 2/2004 | Evangelides |
| 2004/0090662 A1 | 5/2004 | Bang |
| 2004/0114925 A1 | 6/2004 | Berthold |
| 2004/0146305 A1 | 7/2004 | Neubelt |
| 2004/0175187 A1 | 9/2004 | Eiselt |
| 2004/0208506 A1 | 10/2004 | Kinoshita |
| 2004/0213577 A1 | 10/2004 | Sugahara |
| 2005/0025486 A1 | 2/2005 | Zhong |
| 2005/0047781 A1 | 3/2005 | El-Reedy |
| 2005/0074236 A1 | 4/2005 | Urimindi |
| 2005/0078601 A1 | 4/2005 | Moll |
| 2005/0110980 A1 | 5/2005 | Maehara |
| 2006/0067346 A1 | 3/2006 | Tucker |
| 2006/0087975 A1 | 4/2006 | Zheng |
| 2006/0115266 A1 | 6/2006 | Levi |
| 2006/0165079 A1 | 7/2006 | Rodrigo |
| 2006/0176545 A1 | 8/2006 | Nakamura |
| 2008/0008183 A1 | 1/2008 | Takagaki |
| 2009/0028562 A1 | 1/2009 | Gianordoli |
| 2009/0067843 A1 | 3/2009 | Way |
| 2009/0103915 A1 | 4/2009 | Aprile |
| 2009/0226174 A1 | 9/2009 | Csupor |
| 2009/0245786 A1 | 10/2009 | Sakamoto |
| 2009/0262790 A1 | 10/2009 | Molotchko |
| 2009/0290837 A1 | 11/2009 | Chen |
| 2010/0091355 A1 | 4/2010 | Ota |
| 2010/0284687 A1 | 11/2010 | Tanzi |
| 2010/0290780 A1 | 11/2010 | Teipen |
| 2010/0296808 A1 | 11/2010 | Hinderthuer |
| 2011/0116786 A1 | 5/2011 | Wellbrock |
| 2011/0126005 A1 | 5/2011 | Carpenter |
| 2011/0274435 A1 | 11/2011 | Fini |
| 2012/0020672 A1 | 1/2012 | Aguren |
| 2012/0033966 A1 | 2/2012 | Rosenbluth |
| 2012/0078708 A1 | 3/2012 | Taylor |
| 2012/0106971 A1 | 5/2012 | Sugaya |
| 2012/0281950 A1 | 11/2012 | Fattal |
| 2012/0294604 A1 | 11/2012 | Roberts |
| 2013/0016970 A1* | 1/2013 | Koka .................. H04J 14/021 398/49 |
| 2013/0189856 A1 | 7/2013 | Ko |
| 2013/0223484 A1 | 8/2013 | Tang |
| 2013/0236175 A1 | 9/2013 | Sethumadhavan |
| 2013/0243438 A1 | 9/2013 | Tang |
| 2013/0272694 A1 | 10/2013 | Sandstrom |
| 2013/0343757 A1 | 12/2013 | Wigley |
| 2014/0013402 A1 | 1/2014 | Bugenhagen |
| 2014/0029941 A1 | 1/2014 | Bratkovski |
| 2014/0105592 A1 | 4/2014 | Kataria |
| 2014/0153922 A1 | 6/2014 | Ryf |
| 2014/0186021 A1 | 7/2014 | Striegler |
| 2014/0199065 A1 | 7/2014 | Bratkovski |
| 2014/0205286 A1 | 7/2014 | Ji |
| 2014/0248059 A1 | 9/2014 | Tang |
| 2014/0258772 A1 | 9/2014 | Kataria |
| 2014/0286648 A1 | 9/2014 | Buelow |
| 2014/0307304 A1 | 10/2014 | Zhu |
| 2014/0363171 A1 | 12/2014 | Tang |
| 2015/0249501 A1 | 9/2015 | Nagarajan |
| 2015/0296279 A1 | 10/2015 | Bouda |
| 2015/0341123 A1* | 11/2015 | Nagarajan .......... H04B 10/5561 398/43 |
| 2016/0056889 A1 | 2/2016 | Le Taillandier De Gabory |
| 2016/0233959 A1 | 8/2016 | Murshid |
| 2016/0277101 A1 | 9/2016 | Jiang |
| 2016/0306115 A1 | 10/2016 | Koonen |
| 2016/0381442 A1* | 12/2016 | Heanue ................ G02B 6/4274 398/45 |
| 2017/0155466 A1 | 6/2017 | Zhou |
| 2017/0214463 A1 | 7/2017 | Milione |
| 2017/0299900 A1 | 10/2017 | Montoya |
| 2017/0353242 A1 | 12/2017 | Mansouri Rad |
| 2017/0353265 A1 | 12/2017 | Mansouri Rad |

* cited by examiner

FLEXIBLE SWITCH SOLUTION BASED ON CO-PACKAGED OPTICS

BACKGROUND

Field

This disclosure is generally related to optical switches based on co-packaged optics (CPO) technology. More specifically, this disclosure is related to a flexible solution that supports both the datacenter reach (DR) and the far reach (FR) standards.

Related Art

Since the beginning of this century, the increasing demand of the Internet and cloud computing services has caused datacenter traffic to double every one or two years, presenting a big challenge to datacenter networks. To meet the demand of such fast traffic growth, the speed of datacenter networks has evolved quickly. Such rapid evolvement is supported, at least in part, by the repaid development in optical transceiver technologies. New transceiver solutions emerge every three to four years with increased speed. Optical transceivers operating at a data rate of 100 Gbps have been widely deployed in datacenters, and optical transceivers operating at 400 Gbps are starting to be deployed. It is anticipated that the speed of next-generation transceivers can reach beyond 1 Tbps in the next few years. How to continuously increase the speed of the optical transceiver modules to meet the increasing bandwidth demand of cloud computing and big data while maintaining the cost, power consumption, and size of those modules manageable is a key to the continuous development of high-speed optical interconnect technology.

Newly emerged co-packaged optics (CPO) technology allows optical modules to be co-packaged with the switch application-specific integrated circuit (ASIC), thus significantly reducing the length of the switch-optic interconnects and lowering the power consumption of the switch-optic electrical I/O. Switches based on the CPO technology can offer a low-power and low-cost alternative to pluggable optical transceivers in mega datacenters.

However, packaging the high-speed electrical component (i.e., the switch ASIC) and a number of high-speed optical components (e.g., silicon photonic chips) together can be challenging. More specifically, datacenters typically can have both the DR (e.g., DR4) and the FR (e.g., FR4) links, thus requiring equipment vendors to provide CPO-based switches for both the DR and FR standards. Designing and manufacturing CPO-based switches to meet the different interface and optical path requirements of the DR and FR links places an additional burden on equipment vendors.

SUMMARY

One embodiment described herein provides a network switch. The network switch can include a co-packaged optics (CPO) assembly comprising a switch integrated circuit (IC) module and a number of optical modules coupled to the switch IC module, a remote laser source external to the CPO assembly configured to provide continuous wave (CW) light to the optical modules, a number of wavelength multiplexer/demultiplexer arrays external to the CPO assembly, and a plurality of connector arrays comprising a first number of far reach (FR) connector arrays and a second number of datacenter reach (DR) connector arrays.

In a variation on this embodiment, a respective optical module can include a plurality of transmitting paths and a plurality of receiving paths. A respective transmitting path comprises a modulator and a modulator driver, and a respective receiving path comprises a photodetector and an amplifier.

In a further variation, modulators of the transmitting paths and photodetectors of the receiving paths are integrated onto a same photonic integrated chip (PIC).

In a further variation, the optical module can include a digital signal processor (DSP).

In a variation on this embodiment, the remote laser source comprises a laser array with configurable wavelengths.

In a further variation, a subset of lasers within the laser array can be configured to provide CW light of multiple wavelengths to a particular optical module.

In a further variation, the particular optical module is coupled to an FR connector array via a wavelength multiplexer/demultiplexer array.

In a further variation, a subset of lasers within the laser array can be configured to provide CW light of a single wavelength to a particular optical module.

In a further variation, the particular optical module is directly coupled to a DR connector array.

In a variation on this embodiment, the network switch can further include a plurality of 1×2 passive optical couplers. A first output of a respective 1×2 passive optical coupler is configured to couple an optical module to an FR connector array via a wavelength multiplexer/demultiplexer array, and a second output of the respective 1×2 passive optical coupler is configured to couple the optical module to the DR connector array.

In a variation on this embodiment, the network switch can further include a plurality of 1×2 switches. A first output of a respective 1×2 switch is configured to couple an optical module to an FR connector array via a wavelength multiplexer/demultiplexer array, and a second output of the respective 1×2 switch is configured to couple the optical module to the DR connector array.

In a variation on this embodiment, the CPO assembly can include eight optical modules. A respective module is capable of operating at a speed of 32×100 Gbps or higher.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a co-packaged optics switch chip (CPOSC) that can be used in the modular design of a CPO-based switch. More specifically, by leaving the optical source and the wavelength multiplexer/demultiplexer (MUX/DEMUX) outside, the co-packaged chip can be used in a switch with FR interfaces, DR interfaces, or both. The co-packaged chip can include a switch ASIC and a number (e.g., eight) of optical modules co-packaged into a same physical enclosure. An optical module can include a transmitter array comprising modulator drivers and modulators, a receiver array comprising photodetectors (PDs) and amplifiers, and an optional digital signal processor (DSP) module providing clock and date recovery (CDR). The external or remote laser source (RLS) can include a laser array providing optical power to a number of optical channels on each optical module. The wavelength of each laser in the laser array can be configurable to facilitate either FR or DR implementation. Depending on the implementation (FR, DR, or their combination), the switch can include a certain number of multiplexer/demultiplexer arrays (MDAs). The type as well as number of fiber connectors can also be configurable.

Co-Packaged Optics (CPO) Switch Assembly

Figure 1:
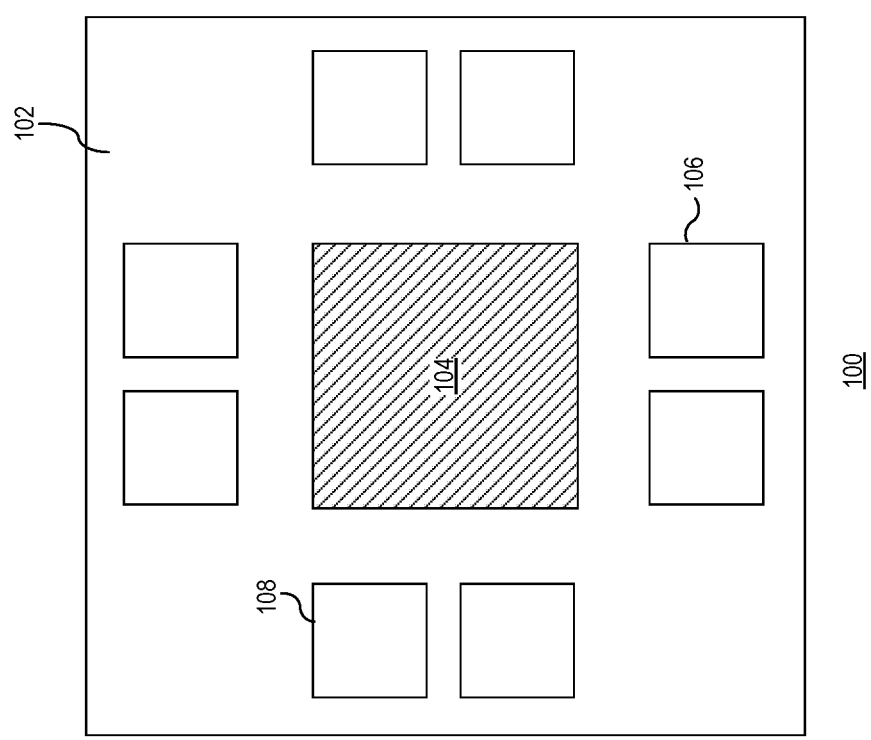
FIG. 1 illustrates an exemplary co-packaged optics (CPO) switch assembly.

FIG. 1 illustrates an exemplary co-packaged optics (CPO) switch assembly. CPO switch assembly 100 can include a packaging substrate 102, a switch integrated circuit (IC) module 104 situated on top of packaging substrate 102, and a number of optical modules (e.g., optical modules 106 and 108) around the perimeter of packaging substrate 102, surrounding switch IC module 104.

Packaging substrate 102 can be a high-density organic substrate with a dimension between 100×100 mm$^2$ and 150×150 mm$^2$. Switch IC module 104 can include a monolithic IC chip or multiple chips functioning as a single switch. In the example shown in FIG. 1, there are eight optical modules in CPO switch assembly 100. In practice, a CPO switch assembly 100 can include more or fewer optical modules, depending on the speed of each module and the speed of switch IC module 104. In one embodiment, each optical module can operate at 32×100 Gbps and switch IC module 104 can operate at 25.6 Tbps. Other combinations are also possible. For example, switch IC module 104 can operate at 51.2 Tbps and CPO switch assembly can include 64 optical modules, each operating at a speed of 800 Gbps. The interface between the optical modules and switch IC module 104 can be high-speed SERDES. As one can see, the length of the high-speed SERDES links between the optical modules and switch IC module 104 can be ultra short, thus reducing the amount of power consumption.

Two types of optical link exist in datacenters, the FR links and the DR links. The FR links use multiple (e.g., four or eight) wavelengths and can have a link distance of 2 km, whereas the DR links use multiple (e.g., four or eight) fiber pairs and can have a link distance of 500 m. Therefore, if a switch is designed for the FR links, an optical module may need to include a MUX/DEMUX to combine/separate multiple wavelengths into/from a single fiber pair coupled to the optical module. For example, for FR4, each fiber will carry four wavelengths. On the other hand, if the switch is designed for the DR links, the optical module does not need to include the MUX/DEMUX, but will be coupled to multiple fiber pairs. Moreover, to couple to the FR or DR link, a switch built upon CPO switch assembly 100 will need to include (e.g., on its front plate) different types of optical connectors. For example, an FR link can use a duplex LC connector, whereas a DR link can use a multi-fiber push on (MPO) connector. Designing and manufacturing different optical modules and different CPO switch assemblies for the FR and DR implementations can be burdensome to equipment vendors. It is desirable to design and manufacture a CPO switch assembly that can be used in both FR and DR implementations.

To have a CPO switch assembly that can be used in both implementations, one may wish to include only the components that are common for both implementations inside the packaged assembly, while leaving other components outside of the packaged assembly. Because the FR solution requires multiple wavelengths and the DR solution requires only one wavelength, in some embodiments, components enabling the wavelength-division multiplexing (WDM) operation are excluded from the packaged assembly. In some embodiments, the WDM components can include the laser source (which provides multiple wavelengths) and the MUX/DEMUX (which provides wavelength multiplexing and demultiplexing).

Figure 2:
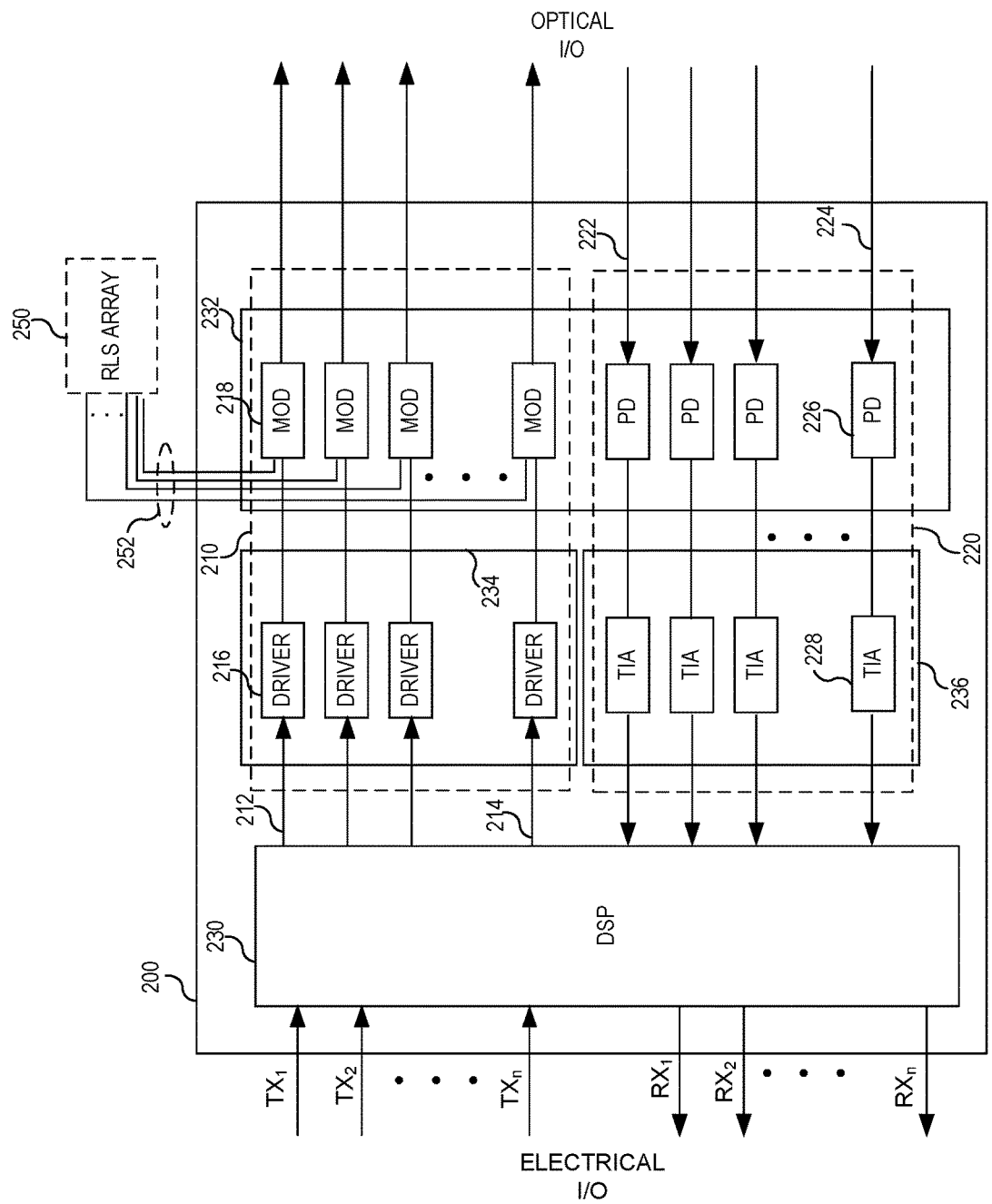
FIG. 2 presents an exemplary optical module inside the CPO switch assembly, according to one embodiment.

FIG. 2 presents an exemplary optical module inside the CPO switch assembly, according to one embodiment. Optical module 200 can include a transmitter array 210, a receiver array 220, and a DSP 230.

Transmitter array 210 can include a number of transmitting paths (e.g., transmitting paths 212 and 214), with each path including a modulator driver and a modulator. For example, transmitting path 212 includes driver 216 and modulator 218. The modulators are coupled to a remote laser source (RLS) array 250 (which in not part of optical module 200 and can include a plurality of laser sources) via a number of optical paths, such as optical paths 252. Receiver array 220 can include a number of receiving paths (e.g., receiving paths 222 and 224), with each path including a photodetector and an amplifier (e.g., a transimpedance amplifier (TIA)). In the example shown in FIG. 2, receiving path 224 includes PD 226 and TIA 228. Each transmitting/receiving path corresponds to an optical channel, which can be a wavelength channel or a spatial channel. Although in FIG. 2 transmitter array 210 and receiver array 220 are each placed in a dashed box, in reality, the various components can be integrated onto different dies. For example, the modulators and the photodetectors can be integrated onto a same optical chip, such as a photonic integrated chip (PIC), as indicated by solid box 232. The PIC can be based on an InP or Si substrate. On the other hand, the modulator drivers can be integrated onto a single electrical chip, as indicated by solid box 234. Similarly, the TIAs can also be integrated onto a single electrical chip, as indicated by solid box 236.

DSP 230 can be coupled to both transmitter array 210 and receiver array 220. In the receiving direction, DSP 230 can provide clock and data recovery function and equalization function; in the transmitting direction, DSP 230 can provide various signal-processing functions, such as equalization. The particular type of DSP and its capability can be determined based on the practical need (e.g., based on the speed and characteristics of the switch IC and optical module 200). DSP 230 can be coupled to the switch IC module via high-speed electrical I/O (e.g., SERDES). On the other hand, optical module 200 can be coupled to fiber connectors on the front plate of the switch module via the optical I/O (shown on the right side of FIG. 2). The optical I/O of optical module 200 can include fiber connectors or integrated optical connectors.

Because optical module 200 does not include components that are specific to either the FR or DR implementation, the CPO switch assembly built using optical modules similar to optical module 200 can be used in a switch with either FR interfaces, or DR interfaces, or both. Therefore, the manufacturer of the CPO switch assembly only needs to design and manufacture a single type of product to meet the needs of both the FR switch solution and the DR switch solution, thus significantly reducing the cost and effort of product development.

CPO-Based Switch

Figure 3:
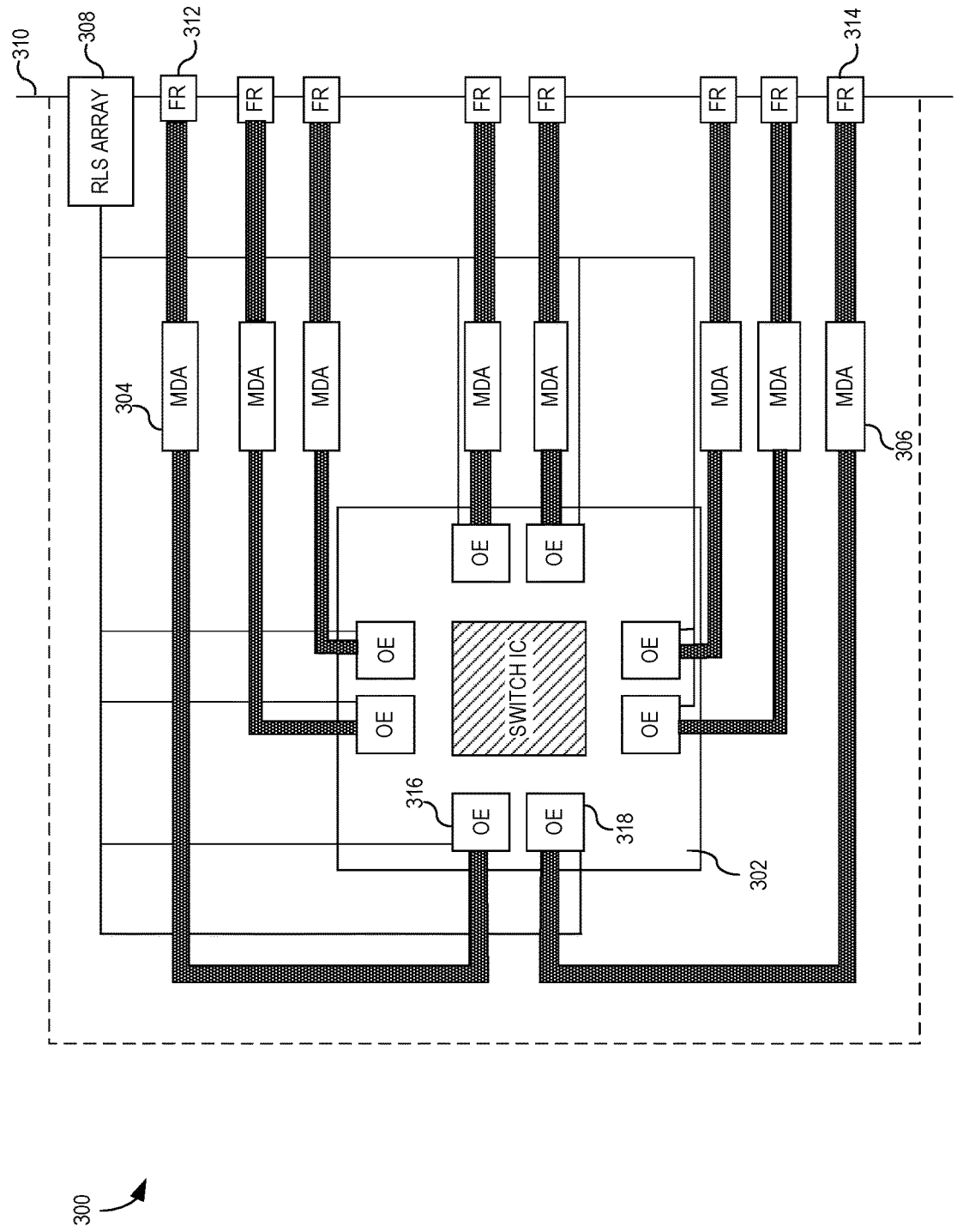
FIG. 3 presents a diagram illustrating an exemplary CPO-based switch, according to one embodiment.

FIG. 3 presents a diagram illustrating an exemplary CPO-based switch, according to one embodiment. In FIG. 3, switch 300 can be constructed for FR applications. Switch 300 can include a CPO switch assembly 302, a number of MUX/DEMUX arrays (MDAs) (e.g., MDAs 304 and 306), a remote laser source (RLS) array 308, a front plate 310, and a number of optical connector arrays (e.g., connector arrays 312 and 314). An optical connector array can also be referred to as an optical connector array because it can include an array of connectors.

CPO switch assembly 302 can be similar to CPO switch assembly 100 shown in FIG. 1 and can include a switch IC module and a number of optical modules (also referred to as optical engines). In some embodiments, the switch IC module can perform Ethernet switching functions. Each optical engine (OE) can be similar to optical module 200 shown in FIG. 2. As discussed previously, in the transmitting direction, the OE includes only the modulators and their drivers; in the receiving direction, the OE includes only the PDs and amplifiers.

RLS array 308 can include an array of external lasers, providing continuous wave (CW) optical signals to the OEs. For the FR4 application, RLS array 308 can provide four coarse wavelength-division multiplexing (CWDM) wavelengths (i.e., CWDM4 wavelengths) to each OE. The number of optical channels can vary on each OE, depending on the design. For example, an OE can have 32 channels in each direction, with each channel operating at 100 Gbps. In such a scenario, 32 pairs of fibers can be coupled to the OE. To provide CW signals to the 32 channels, in some embodiments, RLS array 308 can include an array of eight lasers, with each laser providing CW signals to four channels (i.e., four modulators). Moreover, the eight lasers can be divided into two groups, with each group providing the CWDM4 wavelengths (i.e., 1270, 1290, 1310, and 1330 nm). Depending on the power budget and the characteristics of the external lasers, the number of lasers in RLS array 308 can be more or fewer. Although FIG. 3 shows a single solid line coupling RLS array 308 and the OEs, each solid line can include a plurality of actual light paths (e.g., fibers or waveguides).

FIG. 3 shows that each OE on CPO switch assembly 302 is coupled to an MDA. For example, OE 316 is coupled to MDA 304, and OE 318 is coupled to MDA 306. Similarly, each coupling (shown as a thickened and shaded line) represents multiple (e.g., 32) optical paths. Each MDA can include an array of multiplexers and demultiplexers. For the FR4 application, a multiplexer can multiplex four wavelengths onto a single fiber, and a demultiplexer can demultiplex four wavelengths carried by a single fiber to four separate paths (e.g., fibers or waveguides). In some embodiments, the MDAs can include arrayed-waveguide gratings (AWGs). If each OE has 32 channels (or eight groups, with each group having four wavelength channels) in each direction, each MDA can include eight multiplexers in the transmitting direction and eight demultiplexers in the receiving direction.

FIG. 3 also shows that each MDA is coupled to an optical connector array, which can include an array of connectors. For example, MDA 304 is coupled to connector array 312, and MDA 306 is coupled to connector array 314. The number of multiplexers and demultiplexers corresponds to the number of connectors in each connector array. In the aforementioned 32-channel example, each MDA includes eight multiplexers and eight demultiplexers. Accordingly, the eight multiplexers are respectively coupled to eight FR4 output connectors, and the eight demultiplexers are respectively coupled to eight FR4 input connectors. As discussed previously, an FR4 connector can be a duplex LC connector for coupling to a single-mode fiber (SMF) carrying four wavelength channels in each direction.

In the example shown in FIG. 3, eight connector arrays are installed on front plate 310, one for each OE. The number of actual connectors within each connector array can depend on the number of optical channels supported by each OE. For the FR4 application, if each OE supports 32 channels in each direction, the number of FR4 connector pairs in each connector array can be 32/4=8. If each OE supports 64 channels in each direction, the number of FR4 connector pairs can be 64/4=16.

Figure 4:
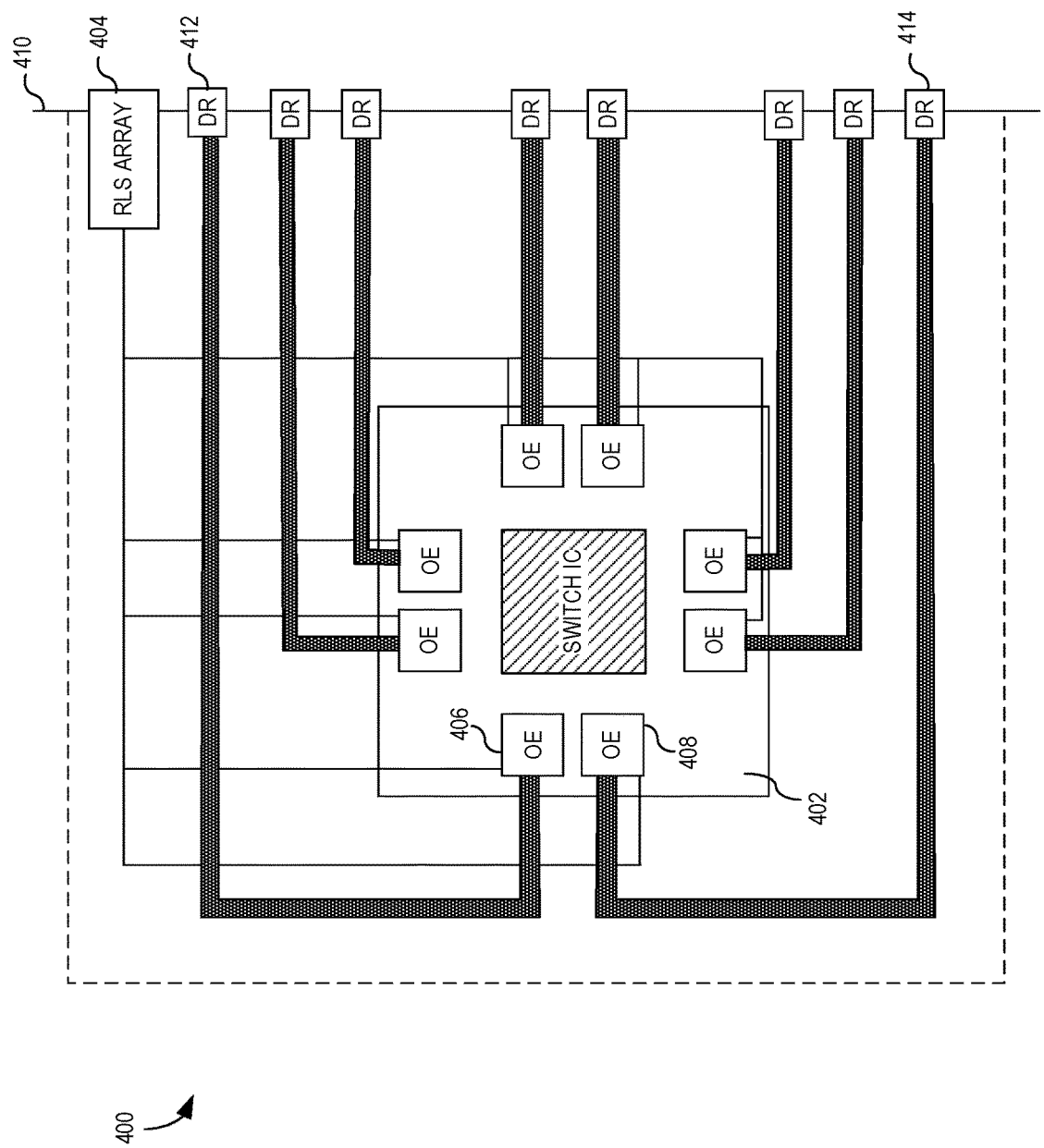
FIG. 4 presents a diagram illustrating an exemplary CPO-based switch, according to one embodiment.

In addition to the FR application, the same type of CPO switch assembly can be used to construct a switch for the DR application. FIG. 4 presents a diagram illustrating an exemplary CPO-based switch, according to one embodiment. In FIG. 4, switch 400 can be constructed for DR applications. Switch 400 can include a CPO switch assembly 402, a remote laser source (RLS) array 404, a front plate 410, and a number of optical connector arrays (e.g., connector arrays 412 and 414).

CPO switch assembly 402 can be similar to CPO switch assembly 100 shown in FIG. 1 and can include a switch IC module and a number of OEs. Each OE can be similar to optical module 200 shown in FIG. 2. As discussed previously, in the transmitting direction, the OE includes only the modulators and their drivers; in the receiving direction, the OE includes only the PDs and amplifiers.

RLS array 404 can include an array of external lasers, providing continuous wave (CW) optical signals to the OEs. For the DR4 application, RLS array 404 can be configured to provide the same wavelength to each OE. In other words, all the external lasers can operate at the same wavelength. The number of optical channels can vary on each OE, depending on the design. For example, an OE can have 32 or 64 channels in each direction, with each channel operating at 100 Gbps. If 32 channels are used, 32 pairs of fibers can be coupled to the OE. In some embodiments, RLS array 404 can include an array of eight lasers, with each laser providing CW signals to four channels (i.e., four modulators), thus being capable of providing CW signals to 32 channels. Depending on the power budget and the characteristics of the external lasers, the number of lasers in RLS array 404 can be more or fewer.

Unlike what is shown in FIG. 3, FIG. 4 shows that each OE on CPO switch assembly 402 is coupled directly (with no MUX/DEMUX in between) to a connector array on front plate 410. For example, OE 406 is coupled to connector array 412, and OE 408 is coupled to connector array 414. In the example shown in FIG. 4, eight connector arrays are installed on front plate 410, one for each OE. The number of actual connectors within each connector array can depend on the number of optical channels supported by each OE. For DR4 application, each connector can include an MPO connector capable of coupling to eight fibers, four for each direction. If the OE supports 32 channels, a connector array can include eight such MPO connectors. If the OE supports 64 channels in each direction, a connector array can include 16 such MPO connectors.

Figure 5A:
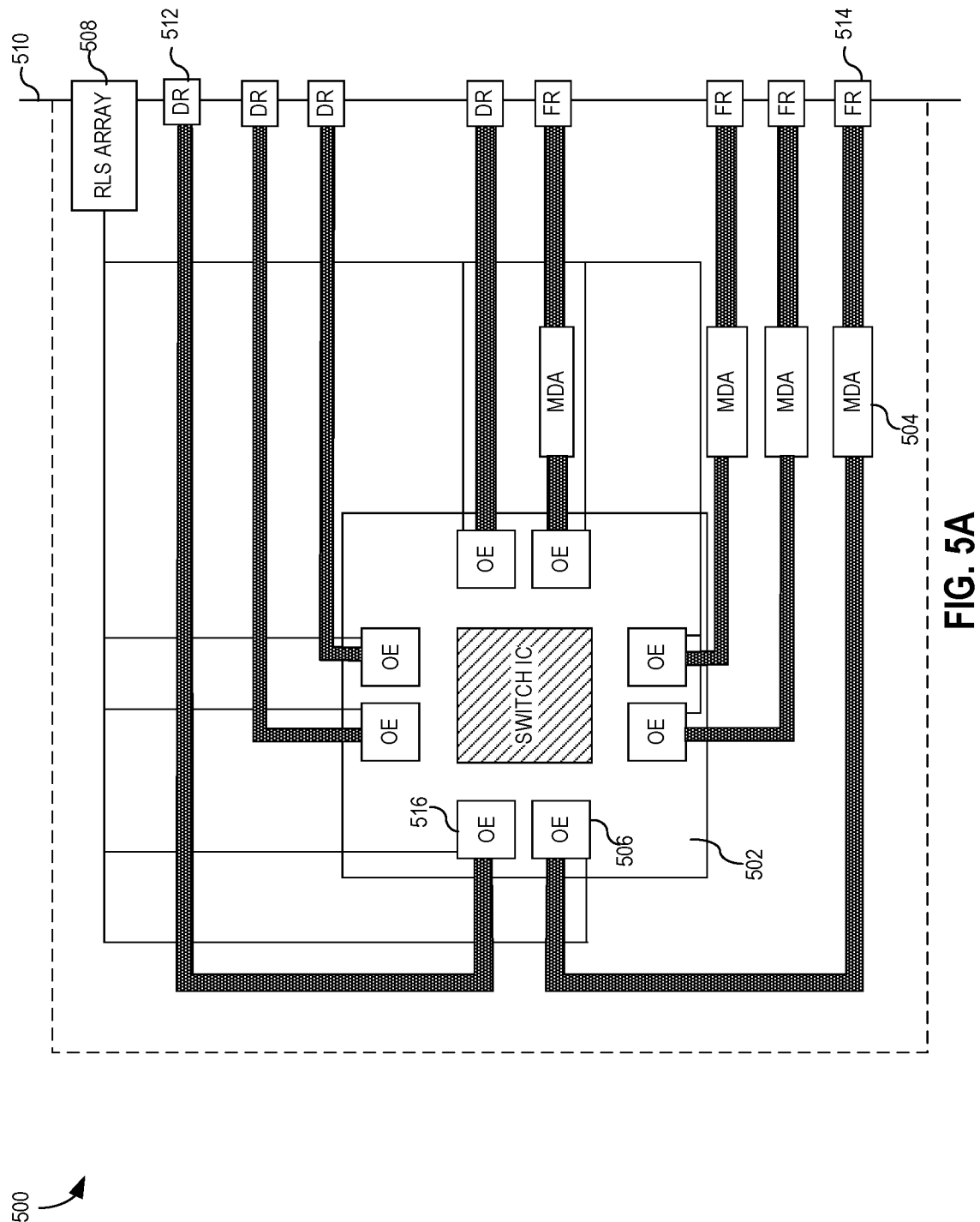
FIG. 5A presents a diagram illustrating an exemplary CPO-based switch, according to one embodiment.

In the examples shown in FIG. 3 and FIG. 4, the CPO-based switch is a pure FR switch supporting all FR links or a pure DR switch supporting all DR links. In practice, it is also possible to construct a hybrid switch that can support a mixture of FR and DR links. FIG. 5A presents a diagram illustrating an exemplary CPO-based switch, according to one embodiment. In FIG. 5A, switch 500 can be constructed to support both the FR and the DR applications. Switch 500 can include a CPO switch assembly 502, a number of MUX/DEMUX arrays (MDAs) (e.g., MDA 504), a remote laser source (RLS) array 508, a front plate 510, and a number of optical connector arrays (e.g., connector arrays 512 and 514).

CPO switch assembly 502 can be similar to CPO switch assembly 302 shown in FIG. 3 or CPO switch assembly 402 shown in FIG. 4. In the example shown in FIG. 5A, a fraction (e.g., half) of the OEs can be directly coupled to optical connector arrays on front plate 510. For example, OE 516 is directly coupled to DR connector array 512, enabling DR links (e.g., DR4 links). Each DR connector array can be similar to the connector arrays shown in FIG. 4. The other OEs can be coupled to FR connector arrays via MDAs. For example, OE 506 can be coupled to FR connector array 514 via MDA 504. Each MDA can be similar to the MDAs shown in FIG. 3, and each FR connector array can be similar to the FR connector arrays shown in FIG. 3.

RLS array 508 can include an array of external lasers, providing continuous wave (CW) optical signals to all OEs. Note that RLS array 508 needs to provide power for both the OEs (e.g., OE 506) coupled to the FR links and the OEs (e.g., OE 516) coupled to the DR links. More specifically, for the OEs coupled to the FR connector arrays (e.g., OE 506), RLS array 508 can provide multiple wavelengths (e.g., CWDM4 wavelengths, if the FR connectors are FR4 connectors) to each OE. On the other hand, for the OEs coupled to the DR connector arrays (e.g., OE 516), RLS array 508 can provide, to each OE, CW light of a single wavelength. This can be achieved by configuring the various external lasers in RLS array 508. For example, the lasers can be divided into two groups, with one group providing the CWDM wavelengths to OEs coupled to the FR links and the other group providing a single wavelength to the OEs coupled to the DR links. The number of lasers in RLS array 508 can be determined based on the power budget and the characteristics of the lasers.

Figure 5B:
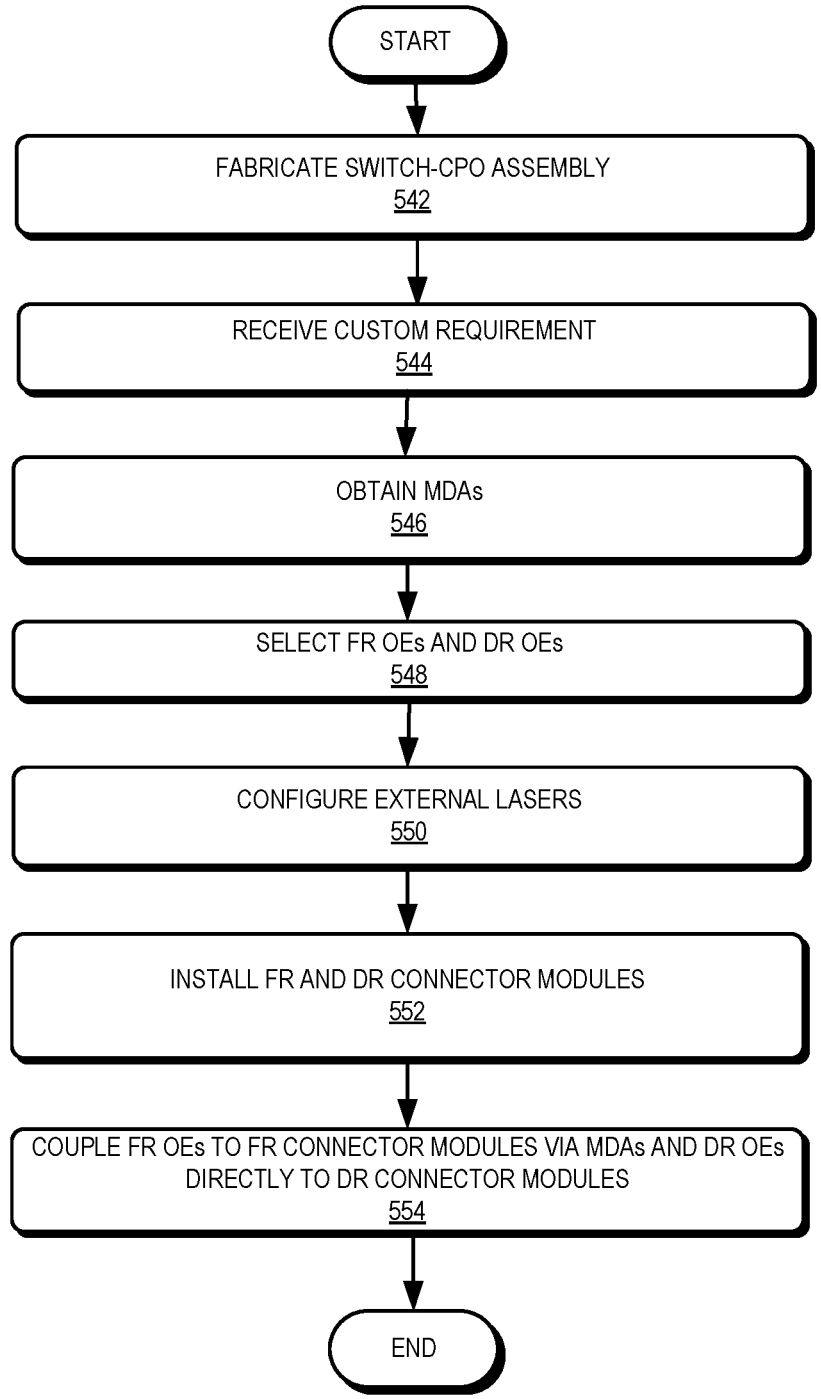
FIG. 5B presents a flowchart illustrating a process for constructing a CPO-based switch, according to one embodiment.

FIG. 5B presents a flowchart illustrating a process for constructing a CPO-based switch, according to one embodiment. During operation, the switch manufacturer first fabricates a switch-CPO assembly (operation 542). The switch-CPO assembly can be similar to the one shown in FIG. 5A and include a switch IC and a number of optical modules packaged together (e.g., mounted on a common packaging substrate and enclosed in the same physical enclosure. The switch IC can be custom designed or an off-the-shelf component. The optical modules can be similar to the ones shown in FIG. 2. An optical module can be coupled to the switch IC via a high-speed SERDES interface. The optical input/output of the optical module can include a number of parallel optical paths. The number of optical modules and the number of parallel optical paths per module can be determined based on the total speed and number of electrical channels of the switch IC. In one embodiment, the switch IC can operate at a speed of 256×100 Gbps or 25.6 Tbps, meaning 256 channels each operating at 100 Gbps. Other switch ICs are also possible, such as one operating at 512×100 Gbps or 128×400 Gbps. To match the speed of the 256×100 Gbps switch IC, eight 32×100 Gbps optical modules or 16 16×100 Gbps optical modules can be included in the switch-CPO assembly. In addition to the parallel optical input/output paths, each OE also includes light paths that couple external laser sources to the modulators within the OE. In one embodiment, these power-providing light paths can also be parallel paths to allow independent assignment of wavelength to each modulator.

The switch manufacturer can receive a requirement from the customer (operation 544). The requirement can specify how many ports on the switch are to be configured as FR ports and how many ports on the switch are to be configured as DR ports. Accordingly, the switch manufacturer can obtain a number of MDAs based on the required number of FR ports (operation 546). The number of MUX/DEMUX modules in each MDA can be determined based on the total number of channels provided by an optical module and the number of wavelength channels included in each FR link. For example, an FR4 link can include four wavelength channels on each fiber and an FR8 link can include eight wavelength channels on each fiber. For the 32-channel optical module and for FR4, each MDA can include eight MUX/DEMUX modules. The switch manufacturer can select an appropriate number of OEs to function as FR OEs and the remaining OEs to function as DR OEs (operation 548). The switch manufacturer can then configure the external lasers coupled to the OEs to ensure that the FR OEs are provided with CW light of multiple wavelengths and the DR OEs are provided with CW light of a single wavelength (operation 550).

The switch manufacturer can subsequently install an appropriate number and type of connector groups on the front plate of the switch (operation 552). FR connector groups can include duplex LC connectors or other types of single-fiber connectors. DR connector groups can include MPO connectors or other types of multi-fiber connectors. The switch manufacturer can then couple the FR OEs to the FR connector groups via the MDAs (e.g., by placing the MDA on the path between the OE and the FR connector group) and couple the DR OEs directly to the DR connector groups (operation 554). Such coupling can be achieved via fiber arrays or waveguides.

In the example shown in FIG. 5A, the number of FR links and the number of the DR links provided by switch 500 can be determined by the manufacturer of the switch. More particularly, by configuring the wavelength of the lasers in the RLS and arranging the coupling between the lasers and OEs, one can determine whether a particular OE is inputting/outputting FR or DR signals. The FR signals can be coupled to the FR connectors via MDAs, whereas the DR signals can be coupled to the DR connectors directly. This can provide great flexibility to the switch manufacturers, allowing them to manufacture switches meeting different demands of customers without the need to significantly change their manufacturing process. The same kind of CPO switch assembly (which is the most difficult part to design and manufacture) can be used in all types (i.e., FR, DR, or hybrid) of switches, thus significantly reducing the manufacturing cost.

Figure 6A:
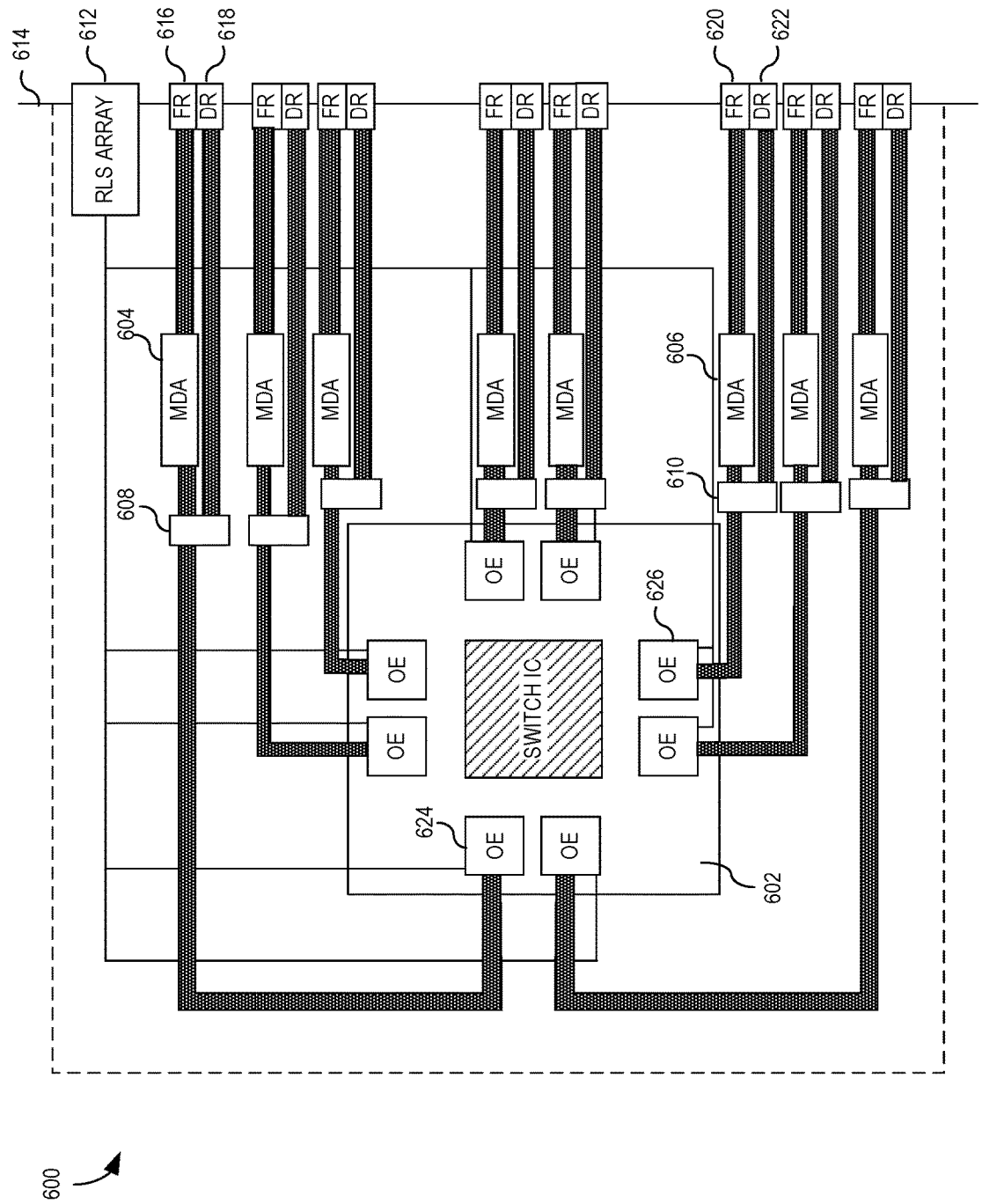
FIG. 6A presents a diagram illustrating an exemplary reconfigurable CPO-based switch, according to one embodiment.

In addition, using the same concept and the same kind of CPO switch assembly, a reconfigurable CPO-based switch can also be constructed, which allows the end users (e.g., datacenter developers) to configure the FR or DR links that can be coupled to the switch on demand. FIG. 6A presents a diagram illustrating an exemplary reconfigurable CPO-based switch, according to one embodiment. In FIG. 6A, switch 600 can include a CPO switch assembly 602, a number of MUX/DEMUX arrays (MDAs) (e.g., MDAs 604 and 606), a number of optical couplers (e.g., couplers 608 and 610), a remote laser source (RLS) array 612, a front plate 614, and a number of optical connector groups (e.g., connector groups 616, 618, 620, and 622).

CPO switch assembly 602 can be similar to CPO switch assemblies shown in FIGS. 3-5A. The MDAs (e.g., MDA 604 and MDA 606) can be similar to the MDAs shown in FIG. 3 and FIG. 5 and can be implemented using various optical filtering technologies, such as thin-film filters (TFF) and interference filters. In one embodiment, a MUX/DEMUX can include an AWG pair. In the example shown in FIG. 6A, an OE within CPO switch assembly 602 can be coupled to an MDA via a 1×2 passive optical coupler. For example, OE 624 can be coupled to MDA 604 via passive optical coupler 608, and OE 626 can be coupled to MDA 606 via passive optical coupler 610. The 1×2 passive optical coupler splits the optical output from the OE and sends it out to two paths. One path is coupled to the MDA and then to an FR coupler module on front plate 614, whereas the other path bypasses the MDA and is directly coupled to a DR coupler module. In FIG. 6A, one output of coupler 608 can be coupled to FR connector group 616 via MDA 604, whereas the other output of coupler 608 can be directly coupled to DR connector group 618. Similarly, one output of coupler 610 can be coupled to FR connector group 620 via MDA 606, whereas the other output of coupler 610 can be directly coupled to DR connector group 622. Each pair of the FR and DR connector groups forms a reconfigurable switch interface (meaning that it can be configured as an FR interface or a DR interface). Note that each coupler in fact is a coupler array, one for each parallel optical path from the OE. In one embodiment, instead of passive couplers, one may choose to use a 1×2 optical switch to couple the OE to a selected connector group.

RLS array 612 can include a number of lasers with configurable wavelengths. Each laser can provide optical power to one or more OEs. By configuring the wavelengths of these lasers, one can configure the operating mode of each OE. For example, if an OE is provided with CW signals of multiple wavelengths (e.g., CWDM4 wavelengths), it will output optical signals having multiple wavelengths, thus enabling FR applications. On the other hand, if the OE is provided with CW signals of a single wavelength, it will output optical signals having the same wavelength, thus enabling DR applications. To ensure full configurability, a large number of lasers may be needed. In one embodiment, it is also possible to allow the user to use lasers that are external to switch 600. Once the user has determined the configuration of switch 600 (e.g., which OEs are needed for FR links and which OEs are needed for DR links), the user can select a number of external lasers to be coupled to switch 600 and determine an appropriate wavelength configuration of these external lasers to provide power to OEs. This can reduce the number of lasers to be included in switch 600.

From FIG. 6A, one can see that front plate 614 now includes twice the number of coupler modules. In fact, in this example of eight OEs, 16 coupler modules are required, two for each OE, forming eight reconfigurable switch interfaces. This built-in redundancy provides configuration flexibility to the users, allowing the users to configure the output mode of the switch based on the practical need. In this example, the user can arbitrarily configure each of the eight switch interfaces to either an FR interface or a DR interface. If an interface is configured as FR, the FR connector group of the interface will be used to couple the switch to FR links, leaving the corresponding DR connector group disconnected. If the interface is configured as DR, the DR connector group of the interface will be used to couple the switch to DR links, leaving the corresponding FR connector group disconnected.

In one particular example, the user can configure RLS array 612 in such a way that modulators within OE 624 operating at 32×100 Gbps receive CW light of four different wavelengths (e.g., CWDM4 wavelengths). In the transmitting direction, passive optical coupler 608 splits the output of OE 624 and sends one portion to MDA 604, which includes eight 4×1 multiplexers. Each multiplexer multiplexes four wavelength channels onto a single spatial channel (e.g., a fiber or a waveguide). The eight fibers or waveguides are then coupled to FR connector group 616, which can include eight duplex LC connectors for coupling to external fibers. In the receiving direction, FR connector group 616 receives, from external fibers, multi-wavelength signals and sends them to MDA 604, which includes eight 1×4 demultiplexers. Each demultiplexer demultiplexes the four wavelengths to four separate spatial channels (e.g., fibers or waveguides) and sends the demultiplexed signals to OE 624 via coupler 608.

In the same example, the user can configure RLS array 612 in such a way that modulators within OE 626 operating at 32×100 Gbps receive CW light of the same wavelength. In the transmitting direction, passive optical coupler 610 splits the output of OE 626 and sends one portion directly to DR connector group 622, which can include eight MPO connector pairs for coupling to external fibers. Each MPO connector can be coupled to four fibers. In the receiving direction, DR connector group 622 receives, from external fibers, 32 channels of optical signals of the same wavelength and sends them to OE 626 via coupler 610.

As one can see from the above example, half of the optical power outputted from each OE is discarded, because the optical coupler sends half the power to a connector group that is not connected to any external links. Using a 1×2 optical switch can reduce the power loss but will require an additional control circuitry that configures the optical switch based on the desired configuration of the CPO-based switch.

Figure 6B:
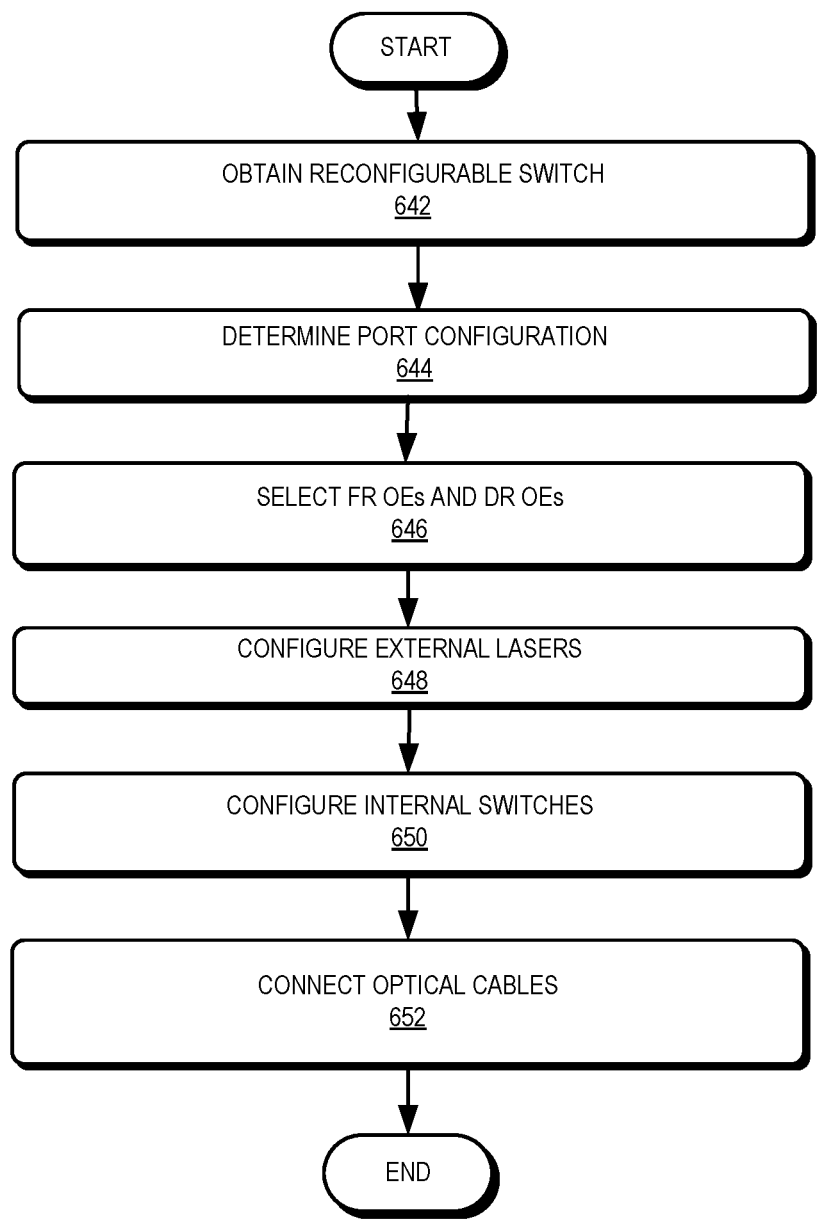
FIG. 6B presents a flowchart illustrating a process for configuring a CPO-based reconfigurable switch, according to one embodiment.

FIG. 6B presents a flowchart illustrating a process for configuring a CPO-based reconfigurable switch, according to one embodiment. During operation, the datacenter administrator obtains a CPO-based reconfigurable switch (operation 642). The CPO-based reconfigurable switch can be similar to the switch shown in FIG. 6A. The number of ports on the switch and speed of each port can vary, depending on the practical need.

Based on the actual implementation of the switch in the datacenter network, the administrator can determine how many ports on the switch are to be configured as FR ports and how many ports on the switch are to be configured as DR ports (operation 644). Based on the desired port configuration, the administrator can select an appropriate number of OEs to function as FR OEs and the remaining OEs to function as DR OEs (operation 646). Accordingly, the administrator can then configure the external lasers coupled to the OEs to ensure that the FR OEs are provided with CW light of multiple wavelengths and the DR OEs are provided with CW light of a single wavelength (operation 648). In some embodiments, this operation may include adding or removing lasers. If 1×2 switches are used inside the switch, the administrator can configure the internal switches such that the input/outputs of the OEs are coupled to the appropriate connector groups (operation 650). For example, the input/output of the FR OEs will be coupled (via MDAs) to the FR connector groups, whereas the DR OEs are directly coupled to the DR connector groups. If a passive optical coupler is used, operation 650 is no longer needed, because the inputs/outputs of the OEs are coupled to both types of connector groups. The datacenter administrator can then complete the switch configuration by connecting external optical cables to the corresponding switch ports (operation 652). FR cables are connected to the FR ports and DR cables are connected to the DR ports.

In general, the disclosed embodiments provide a solution for flexible design and manufacture of CPO-based switches that can be used for both FR and DR applications. More specifically, because the CPO switch assembly only includes components that are common to both FR and DR applications, the same COP assembly can be used for both the FR application and the DR application. The inputs/outputs of the individual OEs within the CPO switch assembly can be configured as FR or DR inputs/outputs by configuring the wavelength of external lasers providing CW light to the OEs. FR-specific components (e.g., wavelength multiplexers and demultiplexers) are kept out of the CPO assembly and can be installed in the switch when needed. In addition, a reconfigurable switch can be provided to allow the user to configure individual ports on the switch as FR ports or DR ports. In the examples shown in FIG. 3, FIG. 4, FIG. 5A, and FIG. 6A, the CPO switch assembly includes eight OEs. In practice, the number of OEs in the CPO switch assembly can be more or fewer. Similarly, the number of optical channels provided by each OE can be more or fewer. Moreover, in the example shown in FIG. 5A and FIG. 6A, each OE can be configured in its entirety to have FR or DR inputs/outputs. It is also possible to divide the inputs/outputs of a single OE into two groups, with one group supporting the FR application and the other group supporting the DR application. Note that the switches shown in the drawings only include components that pertain to the inventive concept. Other components standard to network switches, such as the electrical interface on the back of the switch, power supplies, control circuitries, heat sinks, etc., are not included in the drawing. The CPO-based switch can be a standalone module or a line card on a switch chassis.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A network switch, comprising:
a co-packaged optics (CPO) assembly comprising a switch integrated circuit (IC) module and a number of optical modules coupled to the switch IC module;
a remote laser source external to the CPO assembly configured to provide continuous wave (CW) light to the optical modules;
a number of wavelength multiplexer/demultiplexer arrays external to the CPO assembly;
a plurality of connector arrays comprising a first number of far reach (FR) connector arrays and a second number of datacenter reach (DR) connector arrays; and
a plurality of 1×2 passive optical couplers, wherein an input of each 1×2 passive optical coupler is coupled to a corresponding optical module, wherein a first output of the 1×2 passive optical coupler is coupled to an FR connector array via a wavelength multiplexer/demultiplexer array, and wherein a second output of the 1×2 passive optical coupler is coupled to a DR connector array.

2. The network switch of claim 1, wherein a respective optical module comprises a plurality of transmitting paths and a plurality of receiving paths, wherein a respective transmitting path comprises a modulator and a modulator driver, and wherein a respective receiving path comprises a photodetector and an amplifier.

3. The network switch of claim 2, wherein modulators of the transmitting paths and photodetectors of the receiving paths are integrated onto a same photonic integrated chip (PIC).

4. The network switch of claim 2, wherein the optical module further comprises a digital signal processor (DSP).

5. The network switch of claim 1, wherein the remote laser source comprises a laser array with configurable wavelengths.

6. The network switch of claim 5, wherein a subset of lasers within the laser array can be configured to provide CW light of multiple wavelengths to a particular optical module.

7. The network switch of claim 6, wherein the particular optical module is coupled to an FR link via the corresponding FR connector array.

8. The network switch of claim 5, wherein a subset of lasers within the laser array can be configured to provide CW light of a single wavelength to a particular optical module.

9. The network switch of claim 8, wherein the particular optical module is directly coupled to a DR link via the corresponding DR connector array.

10. The network switch of claim 1, further comprising a plurality of 1×2 switches, wherein a first output of a respective 1×2 switch is configured to couple an optical module to an FR connector array via a wavelength multiplexer/demultiplexer array, and wherein a second output of the respective 1×2 switch is configured to couple the optical module to the DR connector array.

11. The network switch of claim 1, wherein the CPO assembly comprises eight optical modules, wherein a respective module is capable of operating at a speed of 32×100 Gbps or higher.

12. A co-packaged optics (CPO) switch assembly, comprising:
- a switch integrated circuit (IC) module; and
- a number of optical modules coupled to the switch IC module;
- wherein a respective optical module comprises a plurality of transmitting paths and a plurality of receiving paths, wherein a respective transmitting path comprises a modulator and a modulator driver, wherein a respective receiving path comprises a photodetector and an amplifier; wherein the respective optical module is coupled to an input of a 1×2 passive optical coupler, wherein a first output of the 1×2 passive optical coupler is coupled to a far reach (FR) connector array via a wavelength multiplexer/demultiplexer array, and wherein a second output of the 1×2 passive optical coupler is coupled to a datacenter reach (DR) connector array.

13. The co-packaged optics (CPO) switch assembly of claim 12, wherein the optical module is coupled to an array of lasers external to the CPO switch assembly.

14. The co-packaged optics (CPO) switch assembly of claim 13, wherein the array of lasers is configured to provide CW light of multiple wavelengths to the optical module, thereby facilitating the optical module to output optical signals of multiple wavelengths.

15. The co-packaged optics (CPO) switch assembly of claim 14, wherein the optical module is coupled to an FR link via the FR connector array.

16. The co-packaged optics (CPO) switch assembly of claim 13, wherein the array of lasers is configured to provide CW light of a single wavelength to the optical module, thereby facilitating the optical module to output optical signals of a single wavelength.

17. The co-packaged optics (CPO) switch assembly of claim 16, wherein the optical module is coupled to a DR link via the DR connector array.

18. The co-packaged optics (CPO) switch assembly of claim 12, wherein modulators of the transmitting paths and photodetectors of the receiving paths are integrated onto a same photonic integrated chip (PIC).

* * * * *